May 20, 1952 — H. E. BRANDT — 2,597,282
HAND-OPERATED DUSTER
Filed March 21, 1946 — 2 SHEETS—SHEET 1
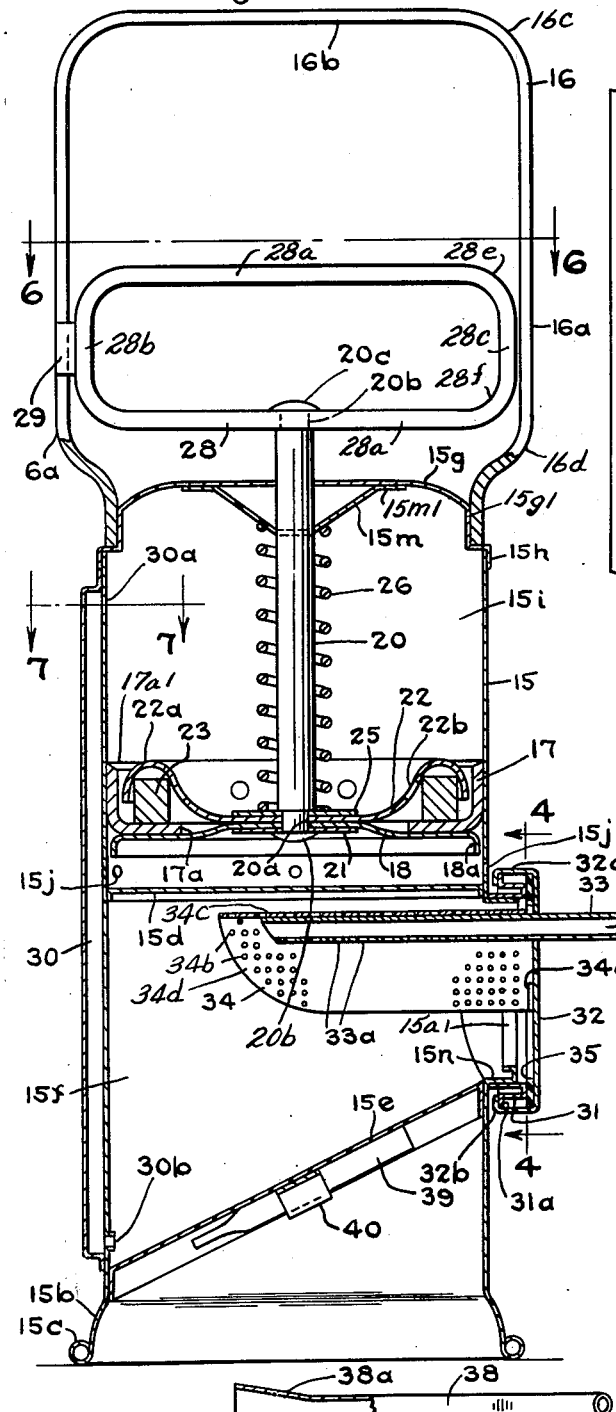
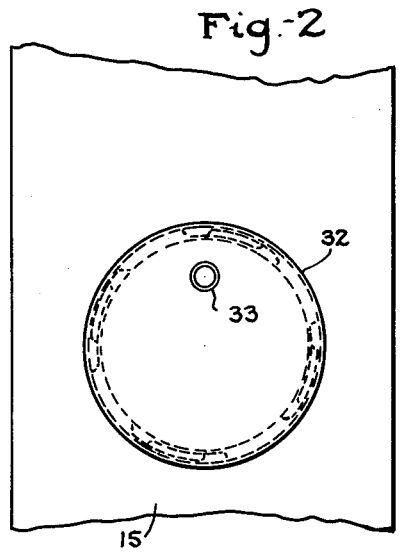
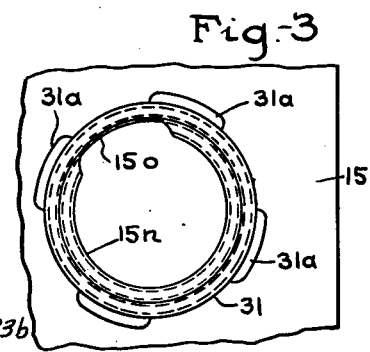
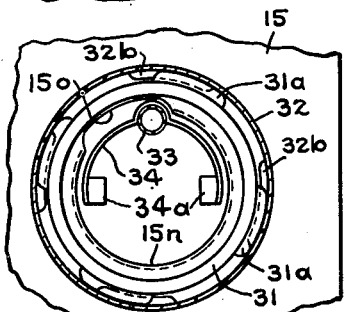
Inventor:
HENRY E. BRANDT
By Chas. E. Reif
Attorney.

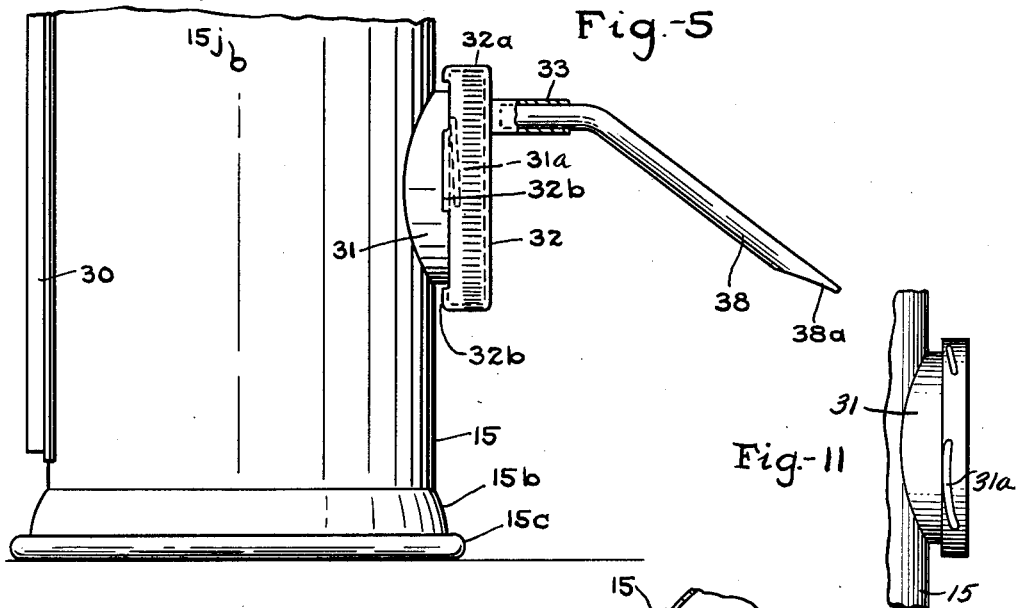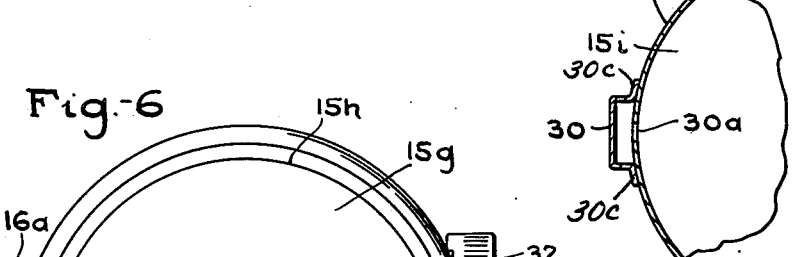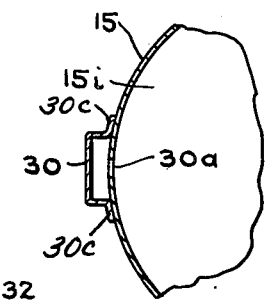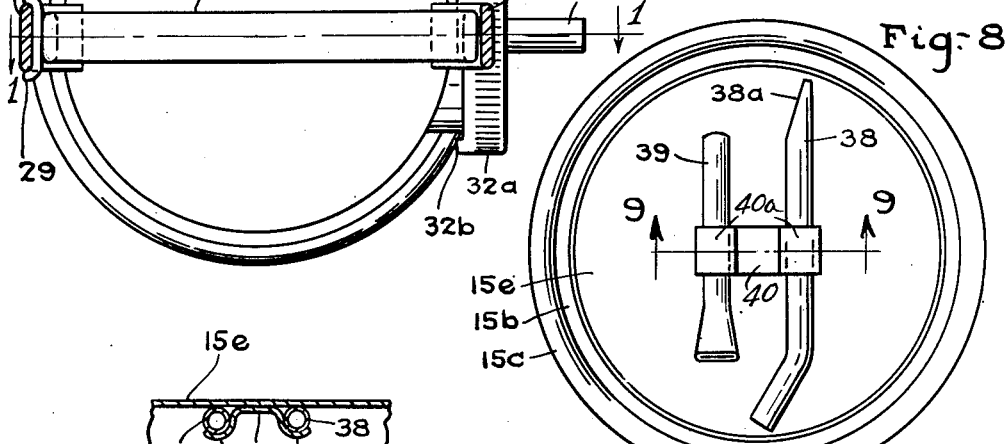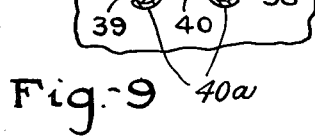

Patented May 20, 1952

2,597,282

UNITED STATES PATENT OFFICE 2,597,282

HAND-OPERATED DUSTER

Henry E. Brandt, North St. Paul, Minn.

Application March 21, 1946, Serial No. 655,907

16 Claims. (Cl. 43—147)

This invention relates to a device for projecting material in minute particles, and while the invention might be applicable to a device for spraying liquid or dust, it particularly is designed for projecting the latter.

It is an object of this invention to provide a device for projecting material in finely divided particles of compact form and one which is very convenient in operation.

It is a further object of the invention to provide such a device comprising a container, preferably of cylindrical form, the same having a handle rigidly secured to its upper end by which it may be carried, said handle having upwardly extending said portions and a top portion together with a second handle movable within said first mentioned handle and adapted to be grasped in the hand of the operator with said top portion and moved by the fingers of said hand for projecting said material.

It is another object of the invention to provide such a structure as set forth in the preceding paragraph in which said upwardly extending portions of said first mentioned handle are substantially parallel and in which said second handle moves parallel to said side portions, guide means being preferably provided for guiding said second handle by said side portions.

It is also an object of the invention to provide a device for discharging dust comprising a casing having an air chamber therein and having a second chamber for containing said dust, said casing having an opening through the side thereof into said second chamber with a projecting flange surrounding said opening, a cap for closing said opening, a discharge conduit carried by said cap having a spout portion at the outer side of said cap and a perforated portion at the inner side of said cap disposable within said second chamber, and means for forcing air from said air chamber into said second chamber for discharging dust through said conduit.

It is also an object of the invention to provide such a structure as set forth in the preceding paragraph, together with a semi-cylindrical screen secured to said cap partially surrounding said conduit and disposable within said second chamber, said screen preferably having a rounded inner end whereby it constitutes a scoop.

It is still further an object of the invention to provide a device for projecting dust comprising an upright container having an air chamber therein and having a second chamber for containing said dust, a conduit connecting said chambers and having an opening into said second chamber adjacent the lower end thereof, said second chamber having a bottom sloping upwardly from said opening to the opposite side of said second chamber whereby the dust will gravitate toward said opening.

Another object of the invention is to provide a device for projecting material in a shower of finely divided particles comprising a casing adapted to contain said material, a discharge spout leading from said casing having a cylindrical end and a nozzle fitting on and rotatable on said end having an angularly bent end portion whereby said nozzle may be rotated on said spout and directed in various directions.

It is also an object of this invention to provide a device for projecting material in a shower of finely divided particles comprising a casing adapted to contain said material, said casing having a discharge spout and having a bottom surrounded by a downwardly extending and supporting flange, a clip secured to said bottom within said flange and constructed and arranged to hold one or more nozzles adapted to be placed on said discharge spout.

These and other objects and advantages of the invention will be fully set forth in the following description made in connection with the accompanying drawings in which like reference characters refer to similar parts throughout the several views and in which:

Fig. 1 is a central vertical section through the device taken substantially on line 1—1 of Fig. 6, portions of the handles of said device being shown in front elevation;

Fig. 2 is a partial view in side elevation as seen from the right of Fig. 1;

Fig. 3 is a partial view in side elevation of the device with a closing cap removed;

Fig. 4 is a vertical section taken substantially on line 4—4 of Fig. 1, as indicated by the arrows;

Fig. 5 is a partial view in front elevation, a small portion thereof being shown in vertical section;

Fig. 6 is a horizontal section taken on line 6—6 of Fig. 1, as indicated by the arrows;

Fig. 7 is a partial horizontal section taken on line 7—7 of Fig. 1, as indicated by the arrows;

Fig. 8 is a bottom plan view of the device;

Fig. 9 is a vertical section taken on line 9—9 of Fig. 8, as indicated by the arrows; and Fig. 10 is a partial sectional view of a discharge nozzle.

Fig. 11 is a partial view of the device as illustrated in Fig. 5, with the cap omitted.

Referring to the drawings, a device is shown comprising a casing or container 15, and while this casing might be variously formed, in the embodiment of the invention illustrated, it is shown as cylindrical.

Casing 15 has a downwardly extending supporting flange 15b at its lower portion having a substantially cylindrical bead 15c at its lower end. Casing 15 is thus constructed and arranged to upstand from a support. A partition 15d extends across casing 15 at an intermediate point and a second partition or bottom member 15e extends across said casing, the same inclining downwardly at a decided angle from one side of said casing to the other. A chamber 15f is formed between partitions 15d and 15e adapted to contain the material to be projected. A top member 15g is provided having a flange 15h surrounding and secured to the upper end of casing 15, said top member having a portion 15g1 reduced in diameter. A handle 16 is provided having upwardly extending side portions 16a which are preferably parallel, said portions 16a converging in curved formation at their lower ends and being respectively secured to opposite sides of the top portion 15g in any suitable manner, as by soldering or welding. Handle 16 has a top portion 16b which in the embodiment of the invention illustrated is shown as substantially horizontal, the same joining the side portions 16a in pronounced curves so that handle 16 has rounded upper and lower corners 16c and 16d, respectively. Handle 16, as shown in Figs. 1 and 6, is made from a comparatively narrow strip of material such as metal, the same having its side edges rounded. The portion of casing 15 between top portion 15g and partition 15d forms an air chamber 15i and said casing is provided with a plurality of circumferentially spaced rather small holes 15j adjacent partition 15d which communicate with the atmosphere. A plunger 17, which will be formed of some flexible material such as leather or rubber compound, has a cylindrical portion engaging the wall of chamber 15i, the upper edge of said plunger preferably being beveled inwardly and downwardly at 17a1, as shown in Fig. 1. Plunger 17 has a a horizontal portion or flange 17a extending inwardly, which at times engages a plate 18 having a downwardly directed peripheral flange 18a, said plate being offset upwardly slightly at its central portion and being bored to have extend centrally therethrough a reduced portion 20a of a plunger rod 20. A washer 21 underlies plate 18 and is engaged by the lower riveted head 20b of plunger rod 20. A second plate 22 has a central portion engaging the central portion of plate 18, the same extending outwardly and being upwardly and reversely curved, as shown in Fig. 1, to form an inverted annular trough portion 22a. A wick member 23 of annular form is disposed in said trough portion 22a and extends to and engages portions 17a of plunger 17, said wick member being shown as substantially rectangular in radial cross section. A washer 25 overlies plate 22 and is engaged by a shoulder formed on rod 20 by the reduced portion 20a thereof. Member 22 has a plurality of holes 22b extending therethrough and circumferentially spaced thereabout. A compression coiled spring 26 surrounds rod 20 bearing at its lower end on washer 25 and at its upper end on a frusto-conical plate 15m depending from top 15g and having a peripheral flange 15m1 engaging and secured to said top in any suitable manner, as by brazing or welding. Rod 20 extends through member 15m and top 15g and has a reduced portion 20b extending through the lower side of handle 28, which portion 20b is riveted over on grip handle 28 to form a rivet head 20c. While handle 28 might be variously formed, in the embodiment of the invention illustrated it is shown as having substantially horizontal top and bottom portions 28a and side portions 28b and 28c extending substantially vertically and joined to said top and bottom portions in curved upper and lower curved formations 28e and 28f, respectively. Handle 28 thus has rounded corners and these corners are such that they may come into position concentric with the corners of handle 16. Handle 28 at one side has secured thereto a plate 29 having end portions which are bent outwardly slightly to be disposed at either side of one of the side portions 16a, as shown in Fig. 6. Member 29 thus forms a guide means for handle 28. A conduit 30 extends along one side of casing 15 and an opening 30a at the top of said conduit connects it with chamber 15i while the opening 30b at the bottom of said conduit connects it with the lower end of chamber 15f. The lower side of partition 15e is just below opening 30b. It will be noted that opening 30a is adjacent the upper end of chamber 15i. Conduit 30 is conveniently formed by a strip of material bent at right angles into trough form and then bent outwardly to form flanges 30c which engage the side of casing 15 and are secured thereto in any suitable manner, as by soldering or welding.

Casing 15 has a filling opening 15a1 at one side adjacent partition 15d, which opening is surrounded by a flange 15n which extends outwardly from said casing at right angles therefrom and then inwardly radially of said flange and then inwardly toward the central axis of said casing 15. Flange 15n is of cylindrical form. A member 31 of cylindrical form surrounds flange 15n and is secured thereto in any suitable manner as by brazing or welding; said member 31 being reversely bent at right angles at its outer side and having a terminal flange which is cut away at circumferentially spaced portions to form lugs 31a. Lugs 31a are inclined or of helical form so as to be nearer the side of casing 15 at one end than at the other. A cap 32 is provided having a cylindrical flange or side portion 32a which is bent inwardly at right angles at its free end and is cut away at circumferentially spaced portions to form spaced lugs 32b. A conduit 33 extends through the top of cap 32 and is secured thereto in any suitable manner, as by soldering. Conduit 33 has a portion 33b extending outwardly some distance beyond cap 32 to form an imperforate discharge spout 33b and extends inwardly quite a distance in chamber 15f and is provided with perforations 33a at its bottom within chamber 15f. A plate 34 having holes 34b therein and shown as a screen of semi-cylindrical form thus having a convex side portion 34c, has end lugs 34a secured to the inner side of the top of cap 32 by soldering or welding. The central portion of screen or plate 34 is bent into smaller semi-cylindrical form to fit around the top of conduit 33 to which it will be secured in any suitable manner, as by soldering or welding. The inner end portion 34d of screen 34, as shown in Fig. 1, is convexly rounded so that the side edges thereof converge and said inner end of said plate is tapered and the same is in the form of a scoop. The inturned portion of flange 15n is cut away at one side to form a recess 15o, as shown in Figs. 3 and 4. A gasket plate or washer 35 is disposed at the inner side of the top of cap 32.

A pair of discharge nozzles 38 and 39 are provided of general cylindrical form. Nozzle 38 is flattened at its open discharge end as shown at 38a, to provide a narrow discharge opening 38a. Nozzle 38 is also bent at an angle intermediate its ends and its end opposite opening 38a is adapted to be placed on and fit in the discharge spout 33, as shown in Fig. 5. Nozzle 39 is also adapted to fit in discharge spout 33. A clip 40 has a central portion secured to the underside of bottom 15e in any suitable manner, as by soldering or welding. Clip 40 has its ends bent outwardly from bottom 15e in curved form and slightly re-curved, as shown in Fig. 9. Clip 40 is somewhat resilient and the nozzles 38 and 39 are constructed and arranged to be placed under and held under the ends 40a of clip 40 respectively, as shown in Figs. 8 and 9.

In operation cap 32 will be removed and with it conduit 33 and scoop 34. Cap 32 can be removed by a counter-clockwise movement thereof to bring lugs 32b into alignment with the spaces between lugs 31a. Said cap can then be moved outwardly. The dust to be projected will then be placed in chamber 15f and screen 34 can be used as a scoop to place the dust in said chamber. Cap 32 will act as a handle for said screen or scoop. The cap with conduit 33 and screen 34 will now be placed in the position shown in Fig. 1. The conduit 33 and the surrounding portion of screen 34 will have to be moved inwardly through recess 15o. This insures that the conduit 33 and scoop 34 will come into the desired and proper position. When so entered, the conduit 33 will be near the left-hand end of recess 15o, as seen in Fig. 4. Lugs 32b will now be moved inwardly through the spaces between lugs 31a so as to come into position in the rear of lugs 31a. Rotative movement of cap 32 in a clockwise direction will now draw the gasket 35 tightly against the outer end of member 31 due to the inclined or helical arrangement of lugs 31a. One of the nozzles 38 or 39 will now be placed in conduit 33. The operator now holds the top 16b of handle 16 adjacent the middle of his hand and engages the top of handle 28 with the fingers of said hand. Handle 28 is then moved toward the top 16b by a closing movement of the hand and plunger 17 is moved upwardly in chamber 15i against the pressure of spring 26. The air in chamber 15i is forced into and through conduit 30, said air passing into said conduit through opening 30a. When plunger 17 is thus moved upwardly it is caused to engage the side of casing 15 tightly by the air pressure and is also forced against plate 18 so that no air can pass it. As plunger 17 moves upwardly air is drawn into chamber 15 below it through the holes 15j. When handle 28 is released, it and plunger 17 will be moved downwardly by spring 26. In this movement plunger 17 moves away from plate 18 slightly and the air below the plunger passes around the edge of plate 18 between the same and plunger 17 and upwardly through the holes 22b. The air forced into conduit 30 passes out through opening 30b and causes the dust in chamber 15f to be agitated or blown about and said dust is forced through the openings 33a into conduit 33 and out through the discharge nozzle 38 or 39. The screen 34 protects the holes 33a and prevents dust from settling thereon and clogging the holes. By rotating nozzle 38 in conduit 33 it can be made to point in a range of directions throughout 360 degrees.

From the above description it will be seen that I have provided a fairly simple, efficient and convenient structure for use as a sprayer or duster. The device can be easily carried by handle 16 and can be operated with the same hand that engages handle 16. It can thus be readily raised and lowered to distribute the material upon plants of greatly different heights. By turning the nozzle 38 so that it points upwardly, the material can be conveniently directed onto the underside of the leaves of a plant. The device is very convenient for directing the material onto house plants and on both the tops and bottoms of the leaves of such plants. The material can be readily charged into the device and the charging opening quickly closed by cap 32. The wick 23, provided with suitable lubricating oil absorbed therein, tends to keep plunger 17 properly lubricated so that it will remain in flexible condition. Nozzles 38 and 39 carried in clip 40 are always thus conveniently accessible and always at hand. The device will be suitably painted or coated to give a pleasing appearance.

It will of course be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A device for projecting material in a shower of minute particles having in combination, a container, a handle extending upwardly from and fixed to said container having substantially parallel upwardly extending portions, a grip handle movable between said portions and substantially parallel thereto, said container having an air chamber therein, a plunger movable in said chamber and secured to said grip handle, said container having a second chamber therein for said material, a discharge member having communication with said second chamber, and a connecting means for directing air moved by said plunger into said second chamber to force material out through said discharge member upon movement of said plunger caused by grasping said first mentioned handle and grip handle and moving the latter.

2. A device for projecting material in a shower of minute particles having in combination, a container, a bail member secured to the top of said container having substantially parallel vertically extending sides and a top piece connecting said sides, a grip handle within said bail member extending between said sides and having a portion substantially parallel to said top piece adapted to be grasped in the hand of the operator with said top piece, said container having an air chamber therein, a plunger movable in said chamber and secured to said grip handle, said container having a second chamber therein for said material, a discharge member having communication with said second chamber, and a connecting means for directing air moved by said plunger into said second chamber to force material out through said discharge member upon movement of said plunger and grip handle.

3. A device for projecting material in a shower of minute particles having in combination, a container, a handle secured to the top of said container and having upwardly extending substantially parallel side portions, a grip handle disposed between and movable substantially parallel to said side portions, guide means on said grip handle cooperating with one of said side portions, said container having an air chamber therein, a plunger movable in said chamber and secured to said grip handle, said container having a second chamber therein for said material, a discharge member having communication with said second chamber, and a connecting means for directing air moved by said plunger into said second chamber to force material out through said discharge member upon movement of said plunger and grip handle.

4. The structure set forth in claim 1, said grip handle forming a closed figure having substantially horizontal top and bottom portions.

5. A device for projecting material in a shower of minute particles having in combination, a casing having an upper chamber therein, a plunger fitting in and movable in said chamber for moving air therein, said casing having a second chamber therein adapted to contain material to be projected, a conduit connecting the upper end of said upper chamber with the lower end of said second chamber, means connecting the lower part of said upper chamber with the atmosphere, a valve in said plunger permitting the passage of air upwardly therethrough but preventing the passage of air downwardly therethrough, a second conduit extending into the upper end of said second chamber having perforations in its lower side within said chamber and having an imperforate portion without said casing forming a discharge spout, and means for reciprocating said plunger to force air from said upper chamber through said first mentioned conduit and into said second chamber to force material out through said second conduit.

6. The structure set forth in claim 5, said first mentioned conduit having an opening adjacent its lower end communicating with said second chamber adjacent the lower end thereof, and said second chamber having a bottom sloping upwardly from adjacent said opening whereby material in said second chamber will gravitate toward said opening.

7. A device for distributing dust having in combination, a casing, a bail handle secured to the top of said casing for carrying the same, a second bail handle movable within said handle, said handles being arranged to be simultaneously grasped by one hand of the operator, a chamber in said casing adapted to contain dust, said casing having an opening in one side thereof communicating with said chamber, a projecting flange surrounding said opening, said flange having circumferentially spaced lugs spaced from the side of said casing and of helical form, a cap having a flange with circumferentially spaced portions adapted to be disposed in the rear of said lugs and draw said cap against said flange upon rotation of said cap, a conduit extending through and carried by said cap having an imperforate portion at the outer side of said cap, adapted to receive a nozzle, and a perforated portion at its lower side at the inner side of said cap within said chamber adjacent said partition, and means for forcing air into said chamber operated by said second bail handle for forcing said material through said conduit.

8. The structure set forth in claim 7, and a semi-cylindrical screen secured to said cap and extending over the top of and partially around said conduit in said chamber.

9. The structure set forth in claim 7, and a semi-cylindrical screen secured to one end of said cap and disposable in said chamber, said screen having a convex side portion at its end to form a scoop.

10. The structure set forth in claim 7, said chamber having a bottom sloping downwardly from adjacent said opening to its opposite side and said chamber having an opening through which air is forced thereinto adjacent said bottom at said opposite side.

11. A device for projecting material in a shower of minute particles having in combination, an upright container of cylindrical form, said container having a bail handle at its upper end rigidly secured thereto, said container having an air chamber therein, and a second chamber therein for containing material to be projected, a discharge member communicating with said second chamber, a plunger in said air chamber for forcing air from said air chamber into said second chamber, and a handle disposed within said first mentioned handle connected to said plunger and adapted to be gripped with said bail by the hand of the operator and moved by the fingers of said hand for actuating said plunger.

12. A device for projecting material in a shower of minute particles having in combination, an upright container of cylindrical form, said container having a handle secured thereto with side portions extending upwardly from the top thereof and having a top portion, said container having an air chamber therein and a second chamber therein for containing material to be projected, a discharge member communicating with said second chamber, a plunger in said air chamber for forcing air into said second chamber, and a handle secured to said plunger adapted to be held with said top portion in the hand of the operator and moved by the fingers of said hand for reciprocating said plunger.

13. A dust distributing device having in combination, a casing having a chamber therein for receiving comminuted material, said casing having an opening at one side of said chamber, means on said casing about said opening for supporting and co-operating with a cap, a cap for closing said opening carried by said means, a semi-cylindrical plate having one end secured to the inner side of said cap and extending into said chamber, the same having side edges converging toward its other end, said plate thus being in the form of a scoop with said cap forming the handle thereof, said plate having a multiplicity of perforations therein and said casing having an air chamber, a plunger movable in said air chamber for forcing air into said first mentioned chamber, and a discharge conduit for said material leading from said first mentioned chamber, said conduit being disposed at the concave side of said plate.

14. The structure set forth in claim 13, said discharge conduit extending through said cap and being supported by said cap.

15. A dust distributing device having in combination, a casing having a chamber therein adapted to contain dust, said casing having a filling opening leading into said chamber, means about said opening for supporting and co-operating with a cap, a cap for closing said opening supported on said means, a semi-cylindrical plate having one end with an edge extending substantially at right angles to the axis of said plate and secured to the inner side of said cap, said plate having side edges converging toward its inner end whereby said inner end is tapered and said plate is in the form of a scoop, said cap forming a handle for said plate, a conduit for conveying air under pressure into said chamber, and a discharge conduit for said dust leading from said chamber, said discharge conduit being disposed at the concave side of said plate and the axes of said plate and discharge conduit being substantially parallel.

16. A device for projecting material in a shower of minute particles having in combination, a container, a bail member secured to the top of said container having parallel vertical extending sides and a horizontally extending top piece connecting said sides, said bail member having upper rounded corner portions formed as arcs, a grip handle within said bail member having spaced top and bottom horizontal portions and vertically extending side portions, said grip handle having rounded corners formed as arcs, a member connected to one side of said grip handle and embracing one side of said bail member and slidable on said latter side, said grip member being adapted to be grasped with said top piece in one hand of the operator and said grip handle moved toward said top piece, said upper rounded corners of said grip handle being adapted to come into substantially parallel relation with the rounded corners on said bail member, said container having an air chamber therein, a plunger movable in said chamber and secured to said grip handle, said container having a second chamber therein for said material, a discharge member having communication with said second chamber and a connecting means for directing air moved by said plunger into said second chamber to force material out through said discharge member upon movement of said plunger and grip handle.

HENRY E. BRANDT.

REFERENCES CITED

The following references are of record in the file of this patent:

UNITED STATES PATENTS

| Number | Name | Date |
|---|---|---|
| 200,218 | Nicholson | Feb. 12, 1878 |
| 795,573 | Barber | July 25, 1905 |
| 1,422,253 | Brown | July 11, 1922 |
| 1,715,986 | Brown | June 4, 1929 |
| 1,869,483 | Knapp et al. | Aug. 2, 1932 |
| 2,121,881 | Newton | June 28, 1938 |
| 2,226,013 | Oys | Dec. 24, 1940 |

FOREIGN PATENTS

| Number | Country | Date |
|---|---|---|
| 167,258 | Great Britain | Aug. 2, 1921 |